United States Patent [19]

Anderson, Jr. et al.

[11] Patent Number: 5,171,434
[45] Date of Patent: Dec. 15, 1992

[54] EFFLUENT RECYCLING SANITATION SYSTEM

[75] Inventors: Charles M. Anderson, Jr.; Stephen C. Cline, both of Zionsville; George W. Cranfill, Speedway, all of Ind.

[73] Assignee: Outdoor Sanitation, Zionsville, Ind.

[21] Appl. No.: 735,868

[22] Filed: Jul. 25, 1991

[51] Int. Cl.$^5$ ............................................. C02F 1/04
[52] U.S. Cl. ................................... 210/121; 210/170; 210/180; 210/181; 210/218; 203/10; 203/49; 159/16.1; 159/47.3
[58] Field of Search ............... 210/121, 170, 180, 181, 210/187, 202, 218, 259, 521, 539, 532.2; 203/10, 49; 159/16.1, 47.3

[56] References Cited

U.S. PATENT DOCUMENTS

| | | | |
|---|---|---|---|
| 1,334,192 | 3/1920 | Thomas | 210/532.2 |
| 1,708,118 | 4/1929 | Carpenter et al. | 210/539 |
| 2,364,472 | 12/1944 | Piatt | 210/532.2 |
| 2,974,800 | 3/1961 | Fleischmann | 210/180 |
| 3,136,608 | 6/1964 | Lindström | 4/DIG. 12 |
| 3,776,383 | 12/1973 | Hargraves | 210/218 |
| 3,864,252 | 2/1975 | Morin et al. | 210/180 |
| 3,956,126 | 5/1976 | Streebin et al. | 210/180 |
| 3,974,075 | 8/1976 | Saigh et al. | 210/181 |
| 4,038,184 | 7/1977 | Svanteson | 210/180 |
| 4,107,795 | 8/1978 | Carter et al. | 210/181 |
| 4,254,515 | 3/1981 | Kiyama et al. | 210/178 |
| 4,333,831 | 6/1982 | Petzinger | 210/170 |
| 4,501,665 | 2/1985 | Wilhelmson | 210/170 |
| 4,534,828 | 8/1985 | Erickson et al. | 159/16.1 |
| 5,043,061 | 8/1991 | Inagaki | 210/180 |

Primary Examiner—Stanley S. Silverman
Assistant Examiner—Christopher Upton
Attorney, Agent, or Firm—Woodard, Emhardt, Naughton, Moriarty & McNett

[57] ABSTRACT

An effluent recycling sanitation system. A first container forms a placid waste separator connected in series to a second container forming an effluent recycling chamber. Both containers are located below ground and are formed from reinforced concrete having a fiberglass liner separated by insulation preventing outward flow of heat energy. The first container is sealed relative to the atmosphere providing for biodegradation of incoming sewage with a vertically extending screen allowing only liquid sewage to flow outwardly into the second container. An air inlet tube extends into the second container allowing fresh air to move into the container with gases then being withdrawn via a second tube extending out of the second container and powered by an air turbine. A solar converter plus auxiliary heat coils located within the second container rinse the temperature within the second container. Liquid within the second container is evaporated via the outlet tube. Ground water agricultural run-offs and landfill leachage may be drained into this system for re-cycling and treatment purposes as well.

12 Claims, 4 Drawing Sheets

EFFLUENT RECYCLING SANITATION SYSTEM

BACKGROUND OF THE INVENTION

1. Field of the Invention:

This invention is in the field of systems for treating sewage allowing for the biodegradation thereof and recycling of the byproducts.

2. Description of the Prior Art:

Disposal of human waste is generally accomplished either via a municipal sewage system or individual residential septic systems. In the latter, the waste is directed to a septic tank for biodegradation with the resultant liquid then being directed outwardly through a plurality of finger outlets scattered within the ground. In many cases, the ground is saturated by rain or other surface waters or simply has a poor absorbency due to the ground material. As a result, the liquid distributed through the finger outlets percolates to the surface providing an unhealthy atmosphere.

A number of systems have been devised in view of the above disadvantages. In U.S. Pat. No. 4,501,665 issued to Wilhelmson, there is disclosed a septic system having two tanks connected in series. The first tank is provided with a basket for catching solid waste with the liquid then falling downwardly into a second tank for eventual distribution to a leach field. Both tanks may be vented to the atmosphere for aerobic bacterial digestion. The second tank is located beneath the elevation of the first tank allowing the liquids at the bottom of the first tank to drain directly into the second tank. In U.S. Pat. No. 3,136,608 issued to Lindstrom, a septic system is disclosed also utilizing a pair of tanks wherein the settling sludge material developed in the first tank slides downwardly under the force of gravity into a second lower tank. Again both tanks are vented to the atmosphere providing for aerobic conditions. A more complicated system is disclosed in U.S. Pat. No. 4,254,515 issued to Kiyama et al., wherein a mechanical device separates the liquids and solids with the liquids then being directed through adsorbent materials with air ventilation then being provided to vaporize the liquid component adsorbed. An early approach is disclosed in U.S. Pat. No. 1,334,192 issued to Thomas et al., wherein solid and liquid waste is emptied into a first tank with the run-off liquid then being directed from the top of the first tank into a second sealed tank for collection and eventual distribution.

Despite the prior systems, there is still the need for a system for allowing the natural biodegradation of sewage to take place in environmentally safe chambers while also allowing for the recycling for the byproducts of the decomposition process. Likewise, it is desirable to reduce or eliminate the amount of effluent material from entering the leach field or sewer system to prevent further environmental pollution. Disclosed herein is a system having a pair of chambers with the first chamber providing for placid waste separation. The first chamber is sealed from the atmosphere allowing the waste to be subject to anaerobic conditions for biodegradation thereof. The liquid present at the top of the first chamber flows into a effluent recycling chamber wherein an atmospheric vent provides an oxygen rich or aerobic atmosphere allowing the liquid contained within the second chamber to evaporate. Excess liquid if any within the second chamber may be directed to the conventional finger outlet, or conventional sanitary sewer system.

SUMMARY OF THE INVENTION

One embodiment of the present invention is a human waste sanitation system containing a settling container to receive liquid human waste and solid human waste to subject same to anaerobic conditions for biodegradation thereof. The container including a top portion and a bottom portion and having a first inlet to receive liquid human waste and solid human waste and a first outlet in the top portion to allow liquid outflow therefrom. An oxygen rich evaporation container is provided including a top end and a bottom end and having a second inlet connected to the first outlet to receive the liquid outflow to subject same to aerobic conditions. A connector extends between the first outlet and the second inlet. A gas circulator extends into the evaporation container to allow liquid within the evaporation container to evaporate and escape via the gas circulator.

Another embodiment of the present invention is a human waste sanitation system containing an evaporation container including a top portion and a bottom portion with the container having a first inlet to receive liquid human waste. A gas circulator extends into the evaporation container to allow liquid within the evaporation container to evaporate and escape via the gas circulator which has an outlet tube extending from the evaporation container to external thereof venting same to the outside. The gas circulator further includes an inlet tube extending from outside into the evaporation container to move outside air into the evaporation container and gas within the evaporation container to move outwardly therefrom via the outlet tube.

It is an object of the present invention to provide a human waste sanitation system subjecting the waste to successive anaerobic and aerobic environments.

A further object of the present invention is to provide a human waste sanitation system for evaporating liquid waste minimizing distribution of waste within the ground.

An additional object of the present invention is to provide a sanitation system for allowing the natural biodegradation of sewage within environmentally safe chambers and for recycling the byproducts of the decomposition process.

Yet a further object of the present invention is to provide a human waste sanitation system which will reduce the amount of effluent material entering a leach field or sewer system.

A final object of this invention is to separate black water from gray water so that the black water may be bio-decomposed and the gray water re-cycled for agricultural and lawn water purposes with the addition of a third tank.

Another object of this invention is to prevent ground water from entering the tanks thereby mixing with black and gray water creating additional environmental damage to ground water through the use of stop valves.

An object of this invention involves draining ground water, agriculture run-off and municipal sewage leachage into the tanks for either re-cycling purposes or aerobic bio-degradation.

Related objects and advantages of the present invention will be apparent from the following description.

DESCRIPTION OF THE PREFERRED EMBODIMENT

Figure 1:
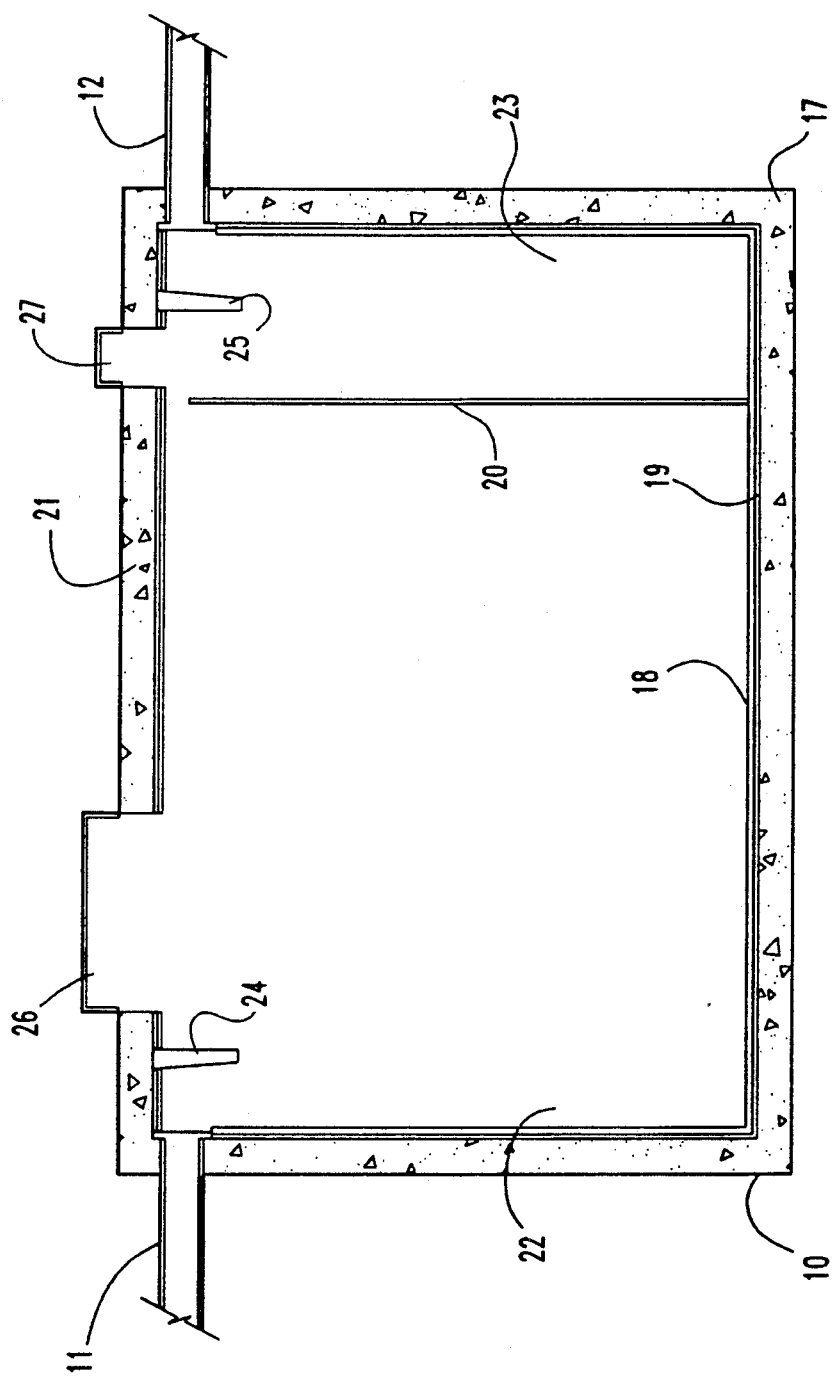
FIG. 1 is a cross sectional view of an in-ground container 10 forming a placid waste separator.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
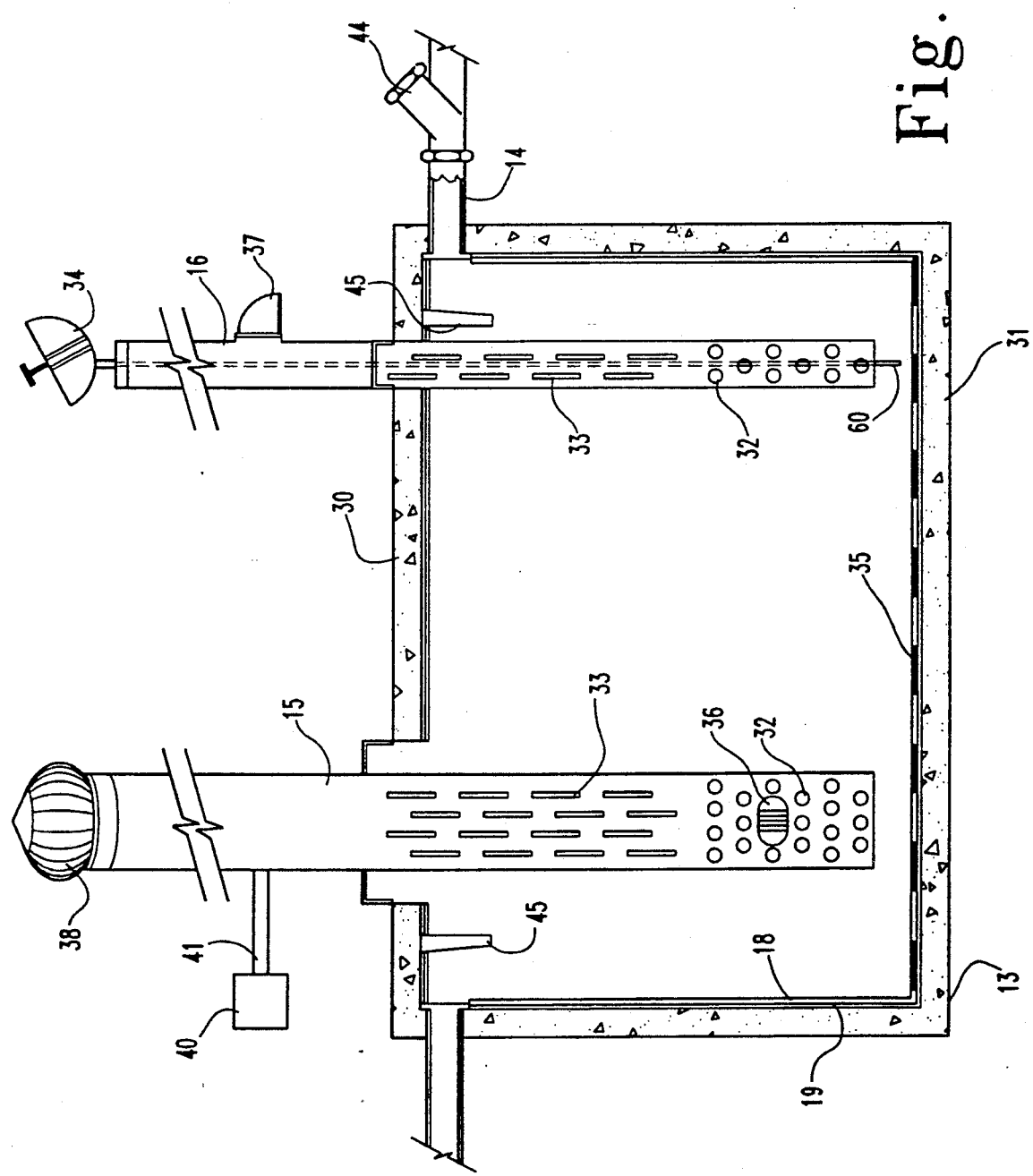
FIG. 2 is a cross sectional view of an in-ground container forming an effluent recycling chamber.
Figure 3:
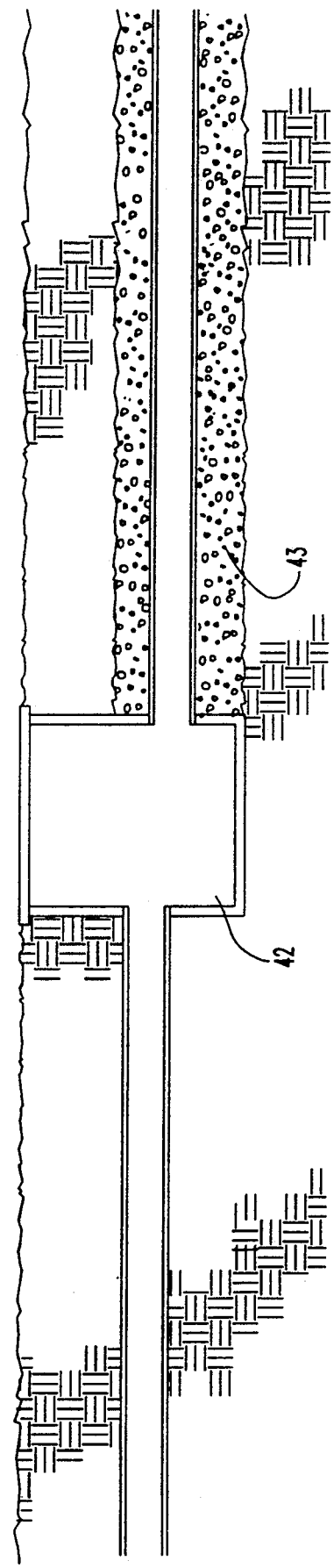
FIG. 3 is a cross sectional view of a liquid distribution system connected to the outlet of the effluent recycling chamber container.

The present invention includes a first container 10 (FIG. 1) forming a placid waste separator connected in series to a second container 13 (FIG. 2) forming an effluent recycling chamber in turn connected to a conventional distribution system shown in FIG. 3. The inlet of the container of FIG. 1 is connected via inlet pipe 11 to a conventional human waste receptacle or the source of black and gray water. The outlet of container 10 is connected via pipe 12 to the inlet of the second container 13 which in turn has an outlet connected via pipe 14 to a conventional sanitary sewer system or in-ground distribution system including a distribution box and a plurality of finger outlets. Container 13 is vented to the atmosphere including an air intake tube 16 and an air outlet tube 15 subjecting the liquid within container 13 to aerobic conditions providing an oxygen rich atmosphere within the chamber facilitating evaporation of the liquid contained therein. Both containers 10 and 13 are located beneath ground level and are essentially on the same elevation with connecting pipe 12 extending horizontally between the top end portions of each tank. The first container 10 is relatively sealed relative to the atmosphere providing for anaerobic conditions or an oxygen poor atmosphere facilitating the bacterial growth within the container and biodegradation of the waste contained therein. The effluent recycling chamber formed by container 13 is designed to separate the effluent material from the placid waste separator formed by container 10 into simpler chemical substances and evaporate the liquids where they can be further recycled or harmlessly released back to the environment with the major chemical substance being released being water vapor.

Both containers 10 and 13 include an outer concrete layer 17 lined with a fiberglass liner 18 between which is located ½ inch of insulation 19. Liner 18 and insulation 19 extend along the top, bottom and side walls of both containers preventing the concrete from being attacked by the waste contained therein while at the same time minimizing the flow of heat outwardly from the tanks. As a result, the heat generated by the biodegradation of the waste is contained within the tanks providing for elevated temperatures and accelerating the further biodegradation of the waste. Likewise, the increased heat energy within the effluent recycling chamber or container 13 facilitates the more rapid evaporation of liquid contained therein.

Liquid and solid human waste enters container 10 via inlet pipe 11. The heavy particles settle to the bottom of container 10 and are attacked by anaerobic bacteria which feed on raw sewage. The byproducts of the resulting degradation are simple chemical substances, including mainly water plus other gases. The lighter particles float to the top of container 10 and from a scum layer and are once again attacked by anaerobic bacteria. As more sewage is added by way of inlet pipe 11, the effluent layer at the top is allowed to flow into the effluent recycling chamber formed by container 13. Larger particles of effluent are held back by a perforated separation screen 20 mounted to the bottom and side walls of container 10 but spaced below the top wall 21 of the container. Screen 20 divides container 10 into a pair of chambers 22 and 23 with the larger particles of effluent retained in chamber 22 allowing further decomposition of the larger materials. The smaller materials of effluent are allowed to flow via pipe 12 into container 13. Baffles 24 and 25 extend downwardly from top wall 21 near but spaced apart from respectively the inlet and outlet of the container. The baffles allow sewage to flow gently into container 10 and prevent larger particles from flowing outwardly via pipe 12. The larger particles are further prevented as previously described from entering container 13 by filter 20 which is a slotted fiberglass strainer. The strainer is slotted to encourage anaerobic microorganisms to move freely throughout the placid waste separator or container 10 while also preventing the larger particles from entering container 13. A manhole 26 and hand hole 27 are provided in top wall 21 and 30 to allow for maintenance and service of the container. Due to the fact that the reinforced concrete 17 has a tendency to crack and because some of the gas byproducts of the biodegradation react negatively with concrete, the inner fiberglass liner 18 prevents harmful waste and anaerobic microorganisms from entering the surrounding soil and thereby polluting the environment. Likewise, insulation 19 helps maintain a constant temperature within the container facilitating the further growth of bacteria to accelerate the biodegradation.

Once the effluent material passes into the effluent recycling chamber formed by container 13, a totally different process takes place. The effluent recycling chamber is oxygen rich thereby destroying the anaerobic microorganisms that enter the chamber. Air intake tube 16 extends through the top wall 30 of the container downwardly toward the bottom wall 31. Likewise, the exhaust tube 15 extends through the top wall and then vertically downward toward the bottom wall. Each tube includes a plurality of circular openings 32 located in the lower portion of the tank and a plurality of slotted openings 33 located in the upper portion of the tank. The circular or round holes 32 allow more air to be drawn across the lower portion of the tank and liquid within the tank to enter both tubes. Likewise, a more restricted amount of air and liquid is allowed to enter through the slotted or oblong openings 33. The slots are sufficiently restricted to prevent floating solid material from entering either tube. A pair of baffles 44 and 45 are mounted to the top wall 30 of tank 13 and extend downwardly being immediately located near but spaced apart from respectively the inlet opening and outlet opening of the container. Baffle 44 insures gentle inward flow from pipe 12 whereas baffle 45 prevents larger objects from moving into pipe 14.

A conventional solar energy converter 34 is mounted atop tube 16 and is operable to collect solar energy and conduct same via heat transfer rod 60 to the liquids below. Rod 60 is connected directly to the dish of the collector 34 and receives heat via conduction. The rod extends downwardly through tube 16 thereby heating the liquid. A conventional series of heat coils 35 extends across the bottom wall and is operable to increase the temperature of the liquid within container 13 facilitating evaporation thereof. A conventional float valve 36 is mounted within the tank and moves a conventional switch to open or close the circuit extending between the conventional power source and heat coils 35. Thus, when the level of liquid rises above a predetermined level within tank 13, float 36 senses same and closes the circuit between the conventional power source and coils 35 allowing flow of energy to the coils and supplementing additional heat to increase the rate of evaporation. Air enters tube 16 via inlet 37 which is provided with an insect screen extending across the opening of the air inlet.

An air turbine 38 is rotatably mounted to the top of air exhaust 15 and is operable to draw air outwardly from container 13 via tube 15 thereby also forcing air to enter the container via inlet 37 and tube 16 furthering evaporation of the liquid contained therein. The effluent recycling chamber formed by container 13 is designed to increase the temperature of the effluent material by way of the solar energy and backup heat coils. The wind-driven turbine draws fresh air by way of the air intake into and across the liquid within container 13.

Figure 4:
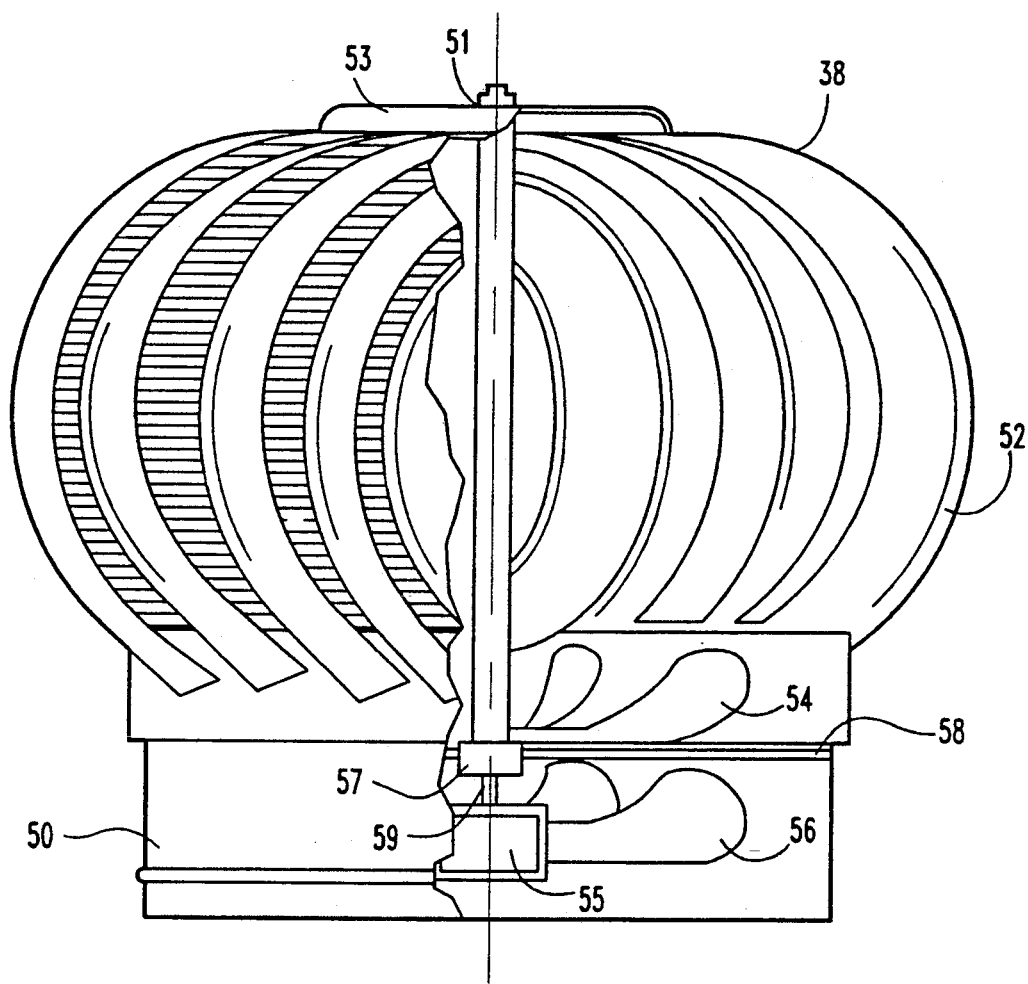
FIG. 4 is a fragmentary enlarged side view of the turbine.

Turbine 38 (FIG. 4) includes a plurality of curved rotor blades 52 mounted to rotor shaft 51 rotatably mounted between crown plate 53 and base 57. The base 57 may be secured to housing 50 by any number of means, such as, a plurality of spokes 58. In order to increase the upwardly flow of gas through tube 15, a wind-driven fan may mounted to rotor shaft 51 so as to turn therewith when the wind drives blades 52 thereby providing further pull of gas upwardly through and out of turbine 38. An optional electric motor 55 may be suspended by frame 59 from base 57. A plurality of fan blades 56 mounted to the output shaft of the electric motor are driven by the motor. The electric motor may be activated whenever the wind falls below a predetermined level. A source of electrical energy provided by a conventional source is connected to motor 55 with an automatic relay switch connecting the motor to the source of electrical energy in the event the wind drops below a predetermined level. As the air passes across the liquid, evaporation takes place and the vapors are either replaced into the environment via the turbine or may be separated at the optional vapor and energy converter 40. Converter 40 is connected to exhaust tube 15 by means of a secondary tube 41 connected to exhaust tube 15. Closure doors within tubes 15 and 41 are operable to direct the exhausted air either outwardly through turbine 38 or to converter 40. Converter 40 includes a conventional condenser which will break down the heated exhaust directed to converter 40 by means of condensing the water therefrom which is in turn directed to a suitable purpose. The heat absorbed by the converter through the condensation process may be directed back into container 13 for the further heating of the liquid contained therein. The liquid condensate may be stored in a holding tank for reuse in any number of residential, commercial or industrial purposes such as watering lawns or gardens. Methane gas can also be separated by converter 40 and stored for fuel while the remaining gases can be rendered inert or released to the atmosphere.

The outlet of container 13 is connected via an auxiliary pipe 14 that leads to either a conventional distribution box 42 (FIG. 3) and leach field 43 or a municipal sewer system in the unlikely event the system cannot keep up with an unusual peak demand load. A check valve 44 is placed in the auxiliary pipe 14 to prevent ground water from entering the system when the ground water table is high or the municipal sewer system has backed up or failed.

Many advantages of the present invention will be apparent from the above description and use of the system described therein. The system disclosed herein enhances the environment by using, recycling and returning natural byproducts to the environment. Further, pollution is reduced or eliminated from gray water at the residential, business, commercial and industrial level. The sewage is treated at the individual user's level before the sewage enters the environment from septic tanks or municipal sewer systems. Likewise, pollution is eliminated from existing septic systems since the septic tanks are designed through the use of the fiberglass liner 18 and reinforced concrete shell 17 by preventing pollutants from seeping through cracks in the tank. Likewise, the waste allowed to enter the leach field is completely biodegraded and at a relatively smaller quantitative level thereby preventing the released liquids from percolating to the ground surface. Last, the effluent material from the system will be in the majority of cases reused as water or released into the atmosphere as harmless gas.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A human waste sanitation system comprising:
a settling container to receive liquid waste and solid human waste to subject same to anaerobic conditions for biodegradation thereof, said container including a top portion and a bottom portion, said container having first inlet means to receive liquid human waste and solid human waste and first outlet means in said top portion to allow liquid outflow therefrom;
an oxygen rich evaporation container including a top end and a bottom end, said evaporation container having second inlet means connected to said first outlet means to receive said liquid outflow to subject same to aerobic conditions;
connecting means extending between said first outlet means and said second inlet means; and
gas circulation means extending into said evaporation container to allow liquid within said evaporation container to evaporate and escape via said gas circulation means; and wherein;
said gas circulation means is operable to force gas inside said evaporation container to flow out of said evaporation container, said gas circulation means includes an outlet tube extending from said evaporation container to external thereof venting same to the outside, said gas circulation means further includes an inlet tube extending from outside into said evaporation container, said gas circulation means operable to move outside air into said evaporation container via said inlet tube and gas within said evaporation container to move outwardly therefrom via said outlet tube; said inlet tube and said outlet tube are dedicated exclusively for gas circulation and have lengths inside said evaporation container which extend through said top end downwardly to said bottom end, said inlet tube and said outlet tube include a plurality of openings to allow liquid and and gas within said evaporation container to flow into said inlet tube and said outlet tube, said plurality of openings are spaced along substantially the entire lengths of said inlet tube and said outlet tube which are inside the evaporation container in such a manner as to direct air to exit said inlet tube immediately above liquid within said evaporation container and at all elevations above said liquid within said evaporation container and then flow across said liquid and all areas above said liquid exiting into said outlet tube immediately above said liquid and at all elevations above said liquid regardless of the level of liquid within said evaporation container.

2. The sanitation system of claim 1 wherein: said gas circulation means includes an air driven turbine to move gas within said evaporation container outwardly therefrom via said outlet tube, said air driven turbine includes a plurality of external blades directly driven by wind and a plurality of internal blades driven by said external blades to force gas therethrough.

3. The sanitation system of claim 2 and further comprising:
heating means within said evaporation container operable to heat liquid within said evaporation container accelerating evaporation thereof.

4. The sanitation system of claim 3 and further comprising:
float valve means connected to said heating means and operable to control operation thereof.

5. The sanitation system of claim 4 and further comprising:
ground finger channel means connected to said evaporation container allowing excess liquid within said evaporation container to escape via said finger channel means; and, back flow valve means connected between said evaporation container and said ground finger channel means limiting flow of ground water into said evaporation container.

6. The sanitation system of claim 1 wherein:
said settling container and said evaporation container are each located entirely under ground, each include an outer concrete container with a plastic lined interior and with insulation material positioned between said concrete container and said plastic lined interior limiting flow of heat out of said settling container and said evaporation container to stabilize the temperature within said container; and,
said settling container includes a vertical perforated wall located near said first outlet means limiting flow of solid human waste thereto.

7. The sanitation system of claim 1 and further comprising:
heating means within said evaporation container operable to heat liquid within said evaporation container accelerating evaporation thereof;
solar energy collecting means operably connected to said heating means, said heating means including a rod connected to said solar energy collecting means operable to receive heat via conduction therefrom, said rod extending downwardly within said inlet tube to heat liquid within said evaporation container by conduction; and, electric motor means operable to force gas through said turbine.

8. A human waste sanitation system comprising:
an evaporation container including a top portion and a bottom portion, said container having first inlet means to receive liquid human waste; and,
gas circulation means extending into said evaporation container to allow liquid within said evaporation container to evaporate and escape via said gas circulation means, said gas circulation means including an outlet tube extending from said evaporation container to external thereof venting same to the outside, said gas circulation means further includes an inlet tube extending from outside into said evaporation container, said gas circulation means operable to move outside air into said evaporation container via said inlet tube and gas within said evaporation container to move outwardly therefrom via said outlet tube; and wherein said inlet tube and said outlet tube have lengths inside said evaporation container which extend through said top portion downwardly to said bottom portion, said inlet tube and said outlet tube include a plurality of openings to allow liquid and gas within said evaporation container to flow into said inlet tube and said outlet tube, said gas circulation means further including an air driven turbine to move gas within said evaporation container outwardly therefrom via set outlet tube, said plurality of openings are spaced along substantially the entire lengths of said inlet tube and said outlet tube which are inside the evaporation container in such a manner as to direct air to exit said inlet tube immediately above liquid within said evaporation container and at all elevations above said liquid with said air then flowing across said liquid and all air above said liquid exiting into said outlet tube immediately above said liquid and at all elevations above said liquid regardless of the level of liquid within said evaporation container.

9. The sanitation system of claim 8 and further comprising:
heating means within said evaporation container operable to heat liquid within said evaporation container accelerating evaporation thereof;
float valve means connected to said heating means and operable to control operation thereof; and,
solar energy collecting means to transfer heat to liquids within said evaporation chamber, said solar energy collecting means including a heat conduction rod extending downwardly within said inlet tube and into said evaporation container.

10. A human waste sanitation system comprising:
a settling container including first inlet means to receive liquid human waste and solid human waste and first outlet means to allow liquid outflow therefrom;

an evaporation container including second inlet means connected to said first outlet means to receive said liquid outflow;

connecting means extending between said first outlet means and said second inlet means;

gas circulation means extending into said evaporation container to allow liquid within said evaporation container to evaporate and escape via said gas circulation means, said gas circulation means includes an outlet tube extending from said evaporation container to external thereof venting same to the outside, said gas circulation means further includes an inlet tube extending from outside into said evaporation container, said gas circulation means operable to move outside air into said evaporation container via said inlet tube and gas within said evaporation container to move outwardly therefrom via said outlet tube, said inlet tube and said outlet tube have lengths inside said evaporation container which include a plurality of openings to allow liquid and gas within said evaporation container to flow into said inlet tube and said outlet tube, said gas circulation means includes an air driven turbine to move gas within said evaporation container outwardly therefrom via said outlet tube, said plurality of openings are spaced along substantially the entire lengths of said inlet tube and said outlet tube which are inside the evaporation container in such a manner as to achieve air circulation above liquid within said evaporation container, said plurality of openings are arranged in a first group of holes of a certain first configuration and a second group of openings of a configuration different than said first configuration with said openings located along said inlet tube and said outlet tube at an elevation higher than said holes which allow more air to be drawn across the lower portion of the evaporation tank.

11. The sanitation system of claim 10 wherein:

said settling container and said evaporation container are each located entirely under ground, each include an outer concrete container with a plastic lined interior and with insulation material positioned between said concrete container and said plastic lined interior limiting flow of heat out of said settling container and said evaporation container.

12. The sanitation system of claim 11 and further comprising:

heating means within said evaporation container operable to heat liquid within said evaporation container accelerating evaporation thereof;

solar energy collecting means to transfer heat to liquids within said evaporation chamber, said solar energy collecting means including a heat conduction rod extending downwardly through said inlet tube and into liquid within said evaporation container to heat said liquid via conduction; and, float valve means connected to said heating means operable to control operation thereof.

* * * * *